April 21, 1931 — F. B. WING — 1,801,707
GENERATOR TRUCK AND HOIST
Filed June 7, 1928 — 3 Sheets-Sheet 1
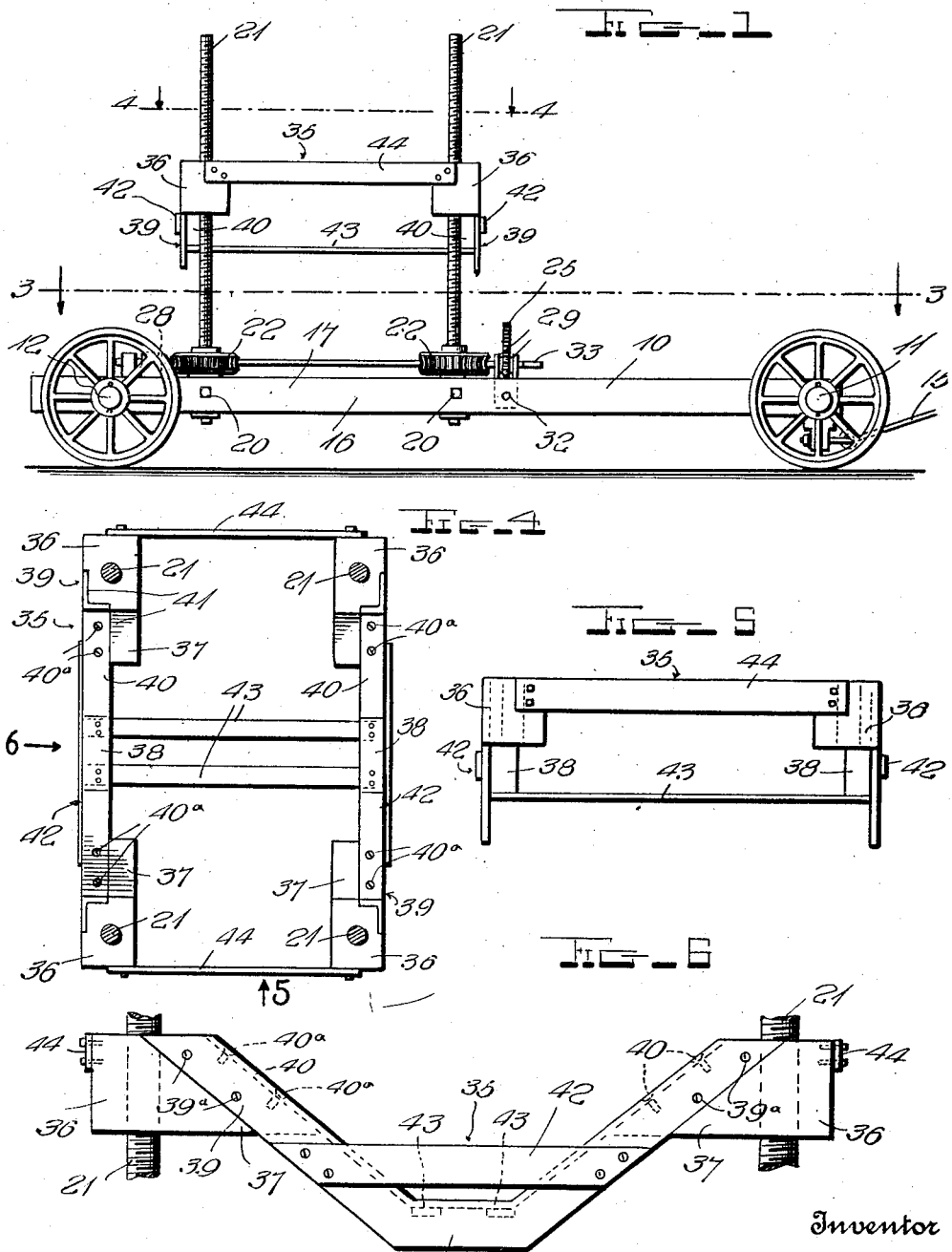

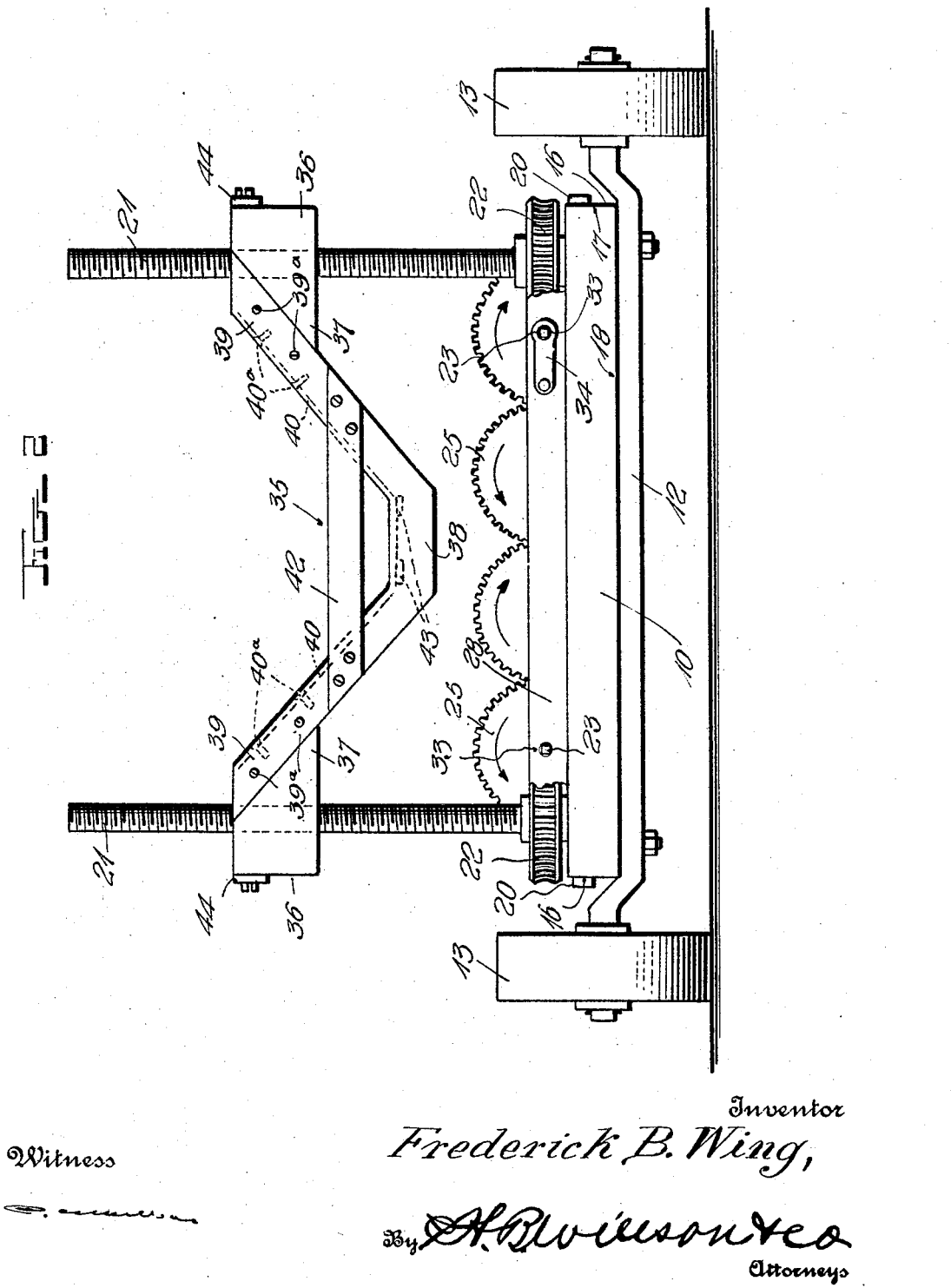

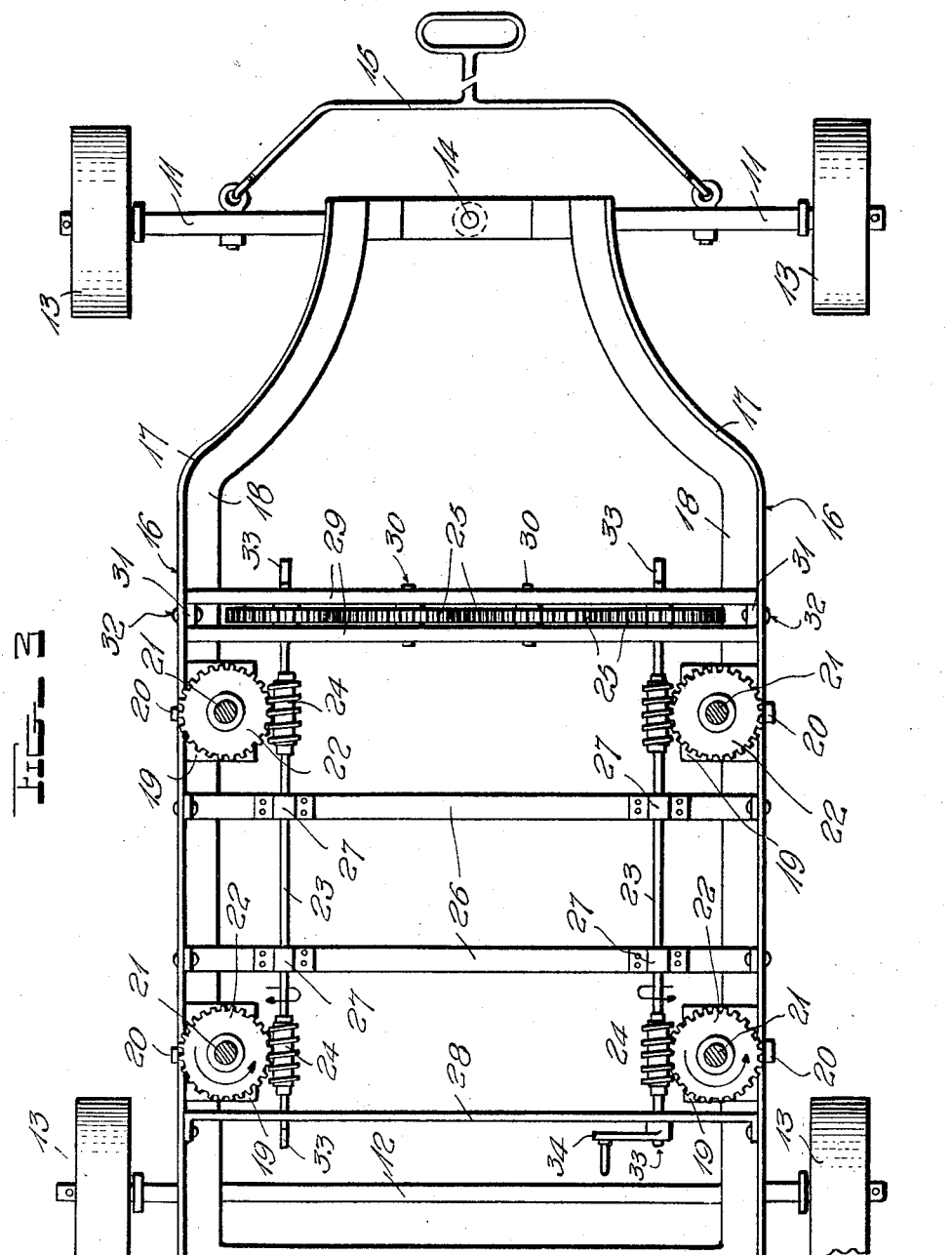

Patented Apr. 21, 1931

1,801,707

UNITED STATES PATENT OFFICE

FREDERICK BOUTELLE WING, OF WATERVILLE, MAINE

GENERATOR TRUCK AND HOIST

Application filed June 7, 1928. Serial No. 283,518.

The invention aims primarily to provide a new and improved device for use in hauling, raising and lowering wheel-driven generators of railway cars, although the same device is usable to equal advantage for handling other car equipment when applying or removing the same, for instance, the air tanks of the compressed air brake systems.

With the foregoing in view, the invention resides in the novel subject matter hereinafter described and claimed, description being accomplished by reference to the accompanying drawing.

Fig. 1 is a side elevation.

Fig. 2 is a rear end elevation partly broken away.

Fig. 3 is a horizontal section on line 3—3 of Fig. 1.

Fig. 4 is a horizontal sectional view on line 4—4 of Fig. 1 showing more particularly a top plan view of the load-supporting cradle.

Figs. 5 and 6 are elevations of the cradle looking in the directions indicated by the arrows 5 and 6 of Fig. 4.

In the drawings above briefly described, the preferred construction is illustrated, and while this construction will be herein specifically explained, it is to be understood that within the scope of the invention as claimed, variations may be made.

A portable frame 10 is provided, mounted on front and rear axles 11—12 respectively, said axles being provided with appropriate wheels 13. The front axle is of course swiveled, as at 14 and it is equipped with an appropriate tongue 15 by means of which the frame may be drawn from place to place, and steered.

The longitudinal side bars 16 of the frame and preferably other parts of said frame also, are formed from angle metal bars, each having a vertical flange 17 and a horizontal flange 18 projecting horizontally inward from the lower edge of said vertical flange. Secured in the angles between the flanges 17—18 of the two bars 16, are four bearing blocks 19, machine screws 20 being shown for securing said blocks to the vertical flanges 17. Rotatably mounted in and supported by these bearing blocks, are four upstanding screws 21, each provided near its lower end with a worm wheel 22. Two worm shafts 23 extend longitudinally of the frame 10 and are provided with worms 24 meshing with the worm wheels or gears 22, and the front ends of said worm shafts are connected for rotation in unison, by a train of intermeshing gears 25. Between the front and rear screws 21, two transverse bars 26 extend across the frame and have their ends suitably secured thereto, these bars being provided with appropriate bearings 27 in which the shafts 23 are rotatably mounted. A third transverse bar 28 which spans the rear portion of the frame 10, acts as additional bearing means for the shafts 23, and two other transverse bars 29 which extend across the front portion of said frame, are also provided with bearing openings through which the shafts extend. The bars 29 are spaced apart and receive the train of gears 25 therebetween to maintain them in mesh and to provide means for supporting the trunnions 30 of the gears which are not secured to the shafts 23. At their ends, the bars 29 are preferably integrally connected with each other as at 31, and are riveted or otherwise secured at 32 to the side bars 16. Preferably, all ends of the shafts 23 are squared or otherwise shaped as at 33, for engagement with a hand-crank or the like 34. Rotation of this crank turns the shaft to which it is applied, and this shaft transmits motion to the other shaft 23 through the instrumentality of the gear train 25, and the worms 24 co-act with the worm gears 22, to simultaneously rotate all of the screws 21. These screws support and serve to vertically adjust a cradle 35, now to be described.

Four blocks 36 are provided with vertical openings through which the screws 21 are threaded, each block having an inwardly declined inner end 37. Two U-shaped angle metal bars 38, having upwardly diverging arms, are secured to these blocks 36. The bars 38 are each provided with a vertical flange 39 and a horizontal flange 40, the former being secured by screws or the like 39ª to the outer vertical sides of the blocks 36, while the flanges 40 are fastened by screws or the like 40ª upon the inwardly declined ends 37 of said blocks. Preferably, these blocks are recessed as shown more particularly at 41 in Fig. 4, to snugly receive the flanges 39—40. The upwardly diverging arms of each bar 38 are connected by a horizontal bar 42 which is riveted or otherwise secured thereto, and two longitudinal bars 43 extend between and have their ends secured to the arm-connecting portions of said bars 38. Two longitudinal bars 44 also extend between and are secured to the blocks 36.

The construction just described, provides a simple and inexpensive, yet a rigid, durable and very efficient cradle structure to receive and retain a generator, compressed air tank or the like, when removing or applying it, and when carrying it from one place to another upon the truck. When a generator or other part is to be removed from a car, the truck is pulled or backed under said car and the crank or the like 34 is operated to raise the cradle snugly under the part to be removed. Then when this part is disconnected from the car, the cradle is lowered and the removed part is carried to the desired destination upon the truck. A reversal of these operations permits quick and easy installation of a generator, tank or the like upon a car.

As above stated, the details disclosed are preferably followed, but within the scope of the invention as claimed, variations may be made.

I claim:—

1. In a device of the class described, four vertical screws and means for supporting and rotating them, four blocks through which said screws are threaded, said blocks having flat inwardly declined inner end portions, and two transversely disposed U-shaped bars having upwardly diverging arms secured upon said flat end portions of the opposed blocks, said declined block end portions being substantially one-half the length of said arms to effectively reinforce the latter against bending.

2. In a device of the class described, four vertical screws and means for supporting and driving them, four blocks through which said screws are threaded, said blocks having flat inwardly declined inner end portions, two U-shaped angle metal bars extending between the opposed blocks and having upwardly diverging arms, one flange of each arm being secured upon one of said flat declined block ends while the other flange of each arm is secured against a flat vertical side of a block, and longitudinal bars tying said blocks and U-shaped bars in fixed relation.

3. In a device of the class described, four vertical screws and means for supporting and driving them, four blocks through which said screws are threaded, said blocks having flat inwardly declined inner end portions, two U-shaped angle metal bars extending between the opposed blocks and having upwardly diverging arms, one flange of each arm being secured upon one of said flat declined block ends while the other flange of each arm is secured against a flat vertical side of a block, longitudinal bars connecting the arm-connecting portions of said U-shaped bars with each other, additional longitudinal bars secured at their ends to said blocks, and transverse bars above the arm-connecting portions of said U-shaped bars and secured at their ends to the arms of these bars.

In testimony whereof I have hereunto affixed my signature.

FREDERICK BOUTELLE WING.